United States Patent
Woo et al.

(10) Patent No.: US 10,886,514 B2
(45) Date of Patent: Jan. 5, 2021

(54) SEPARATOR FOR LITHIUM SECONDARY BATTERY AND LITHIUM SECONDARY BATTERY INCLUDING THE SAME

(71) Applicant: LG CHEM, LTD., Seoul (KR)

(72) Inventors: Sang Wook Woo, Daejeon (KR); Oh Byong Chae, Daejeon (KR); Hee Won Choi, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 196 days.

(21) Appl. No.: 15/761,724

(22) PCT Filed: May 30, 2017

(86) PCT No.: PCT/KR2017/005651
§ 371 (c)(1),
(2) Date: Mar. 20, 2018

(87) PCT Pub. No.: WO2017/209495
PCT Pub. Date: Dec. 7, 2017

(65) Prior Publication Data
US 2018/0358596 A1    Dec. 13, 2018

(30) Foreign Application Priority Data

May 30, 2016 (KR) .................. 10-2016-0066720
May 30, 2017 (KR) .................. 10-2017-0066899

(51) Int. Cl.
H01M 2/16    (2006.01)
H01M 2/14    (2006.01)
(Continued)

(52) U.S. Cl.
CPC .......... *H01M 2/1653* (2013.01); *B32B 27/00* (2013.01); *C08J 7/126* (2013.01); *H01M 2/145* (2013.01);
(Continued)

(58) Field of Classification Search
CPC ....... B32B 27/00; C08J 2323/12; C08J 7/126; H01M 10/052; H01M 10/0525;
(Continued)

(56) References Cited

U.S. PATENT DOCUMENTS 5,484,651 A    1/1996 Sasaki et al.
2006/0154140 A1    7/2006 Yamamoto et al.
(Continued)

FOREIGN PATENT DOCUMENTS

CN    101501899 A    8/2009
CN    101663778 A    3/2010
(Continued)

OTHER PUBLICATIONS

Extended European Search Report for European Application No. 17806988,6, dated Aug. 3, 2018.
(Continued)

*Primary Examiner* — Lingwen R Zeng
(74) *Attorney, Agent, or Firm* — Birch, Stewart, Kolasch & Birch, LLP (57) ABSTRACT

The present invention relates to a separator for a lithium secondary battery, including a porous resin comprising one or more polar functional groups selected from the group
(Continued)

consisting of —C—F; and —C—OOH and —C=O on a surface thereof, wherein, among the polar functional groups, a molar ratio of —C—OOH and —C=O to —C—F ranges from 0.2:0.8 to 0.8:0.2, and a method of manufacturing the same.

11 Claims, 6 Drawing Sheets

(51) Int. Cl.
| | |
|---|---|
| *H01M 10/0525* | (2010.01) |
| *H01M 4/38* | (2006.01) |
| *H01M 4/134* | (2010.01) |
| *H01M 4/62* | (2006.01) |
| *H01M 10/052* | (2010.01) |
| *B32B 27/00* | (2006.01) |
| *C08J 7/12* | (2006.01) |
| *H01M 4/36* | (2006.01) |
| *H01M 4/02* | (2006.01) |

(52) U.S. Cl.
CPC ........... *H01M 4/134* (2013.01); *H01M 4/366* (2013.01); *H01M 4/382* (2013.01); *H01M 4/628* (2013.01); *H01M 10/052* (2013.01); *H01M 10/0525* (2013.01); *C08J 2323/12* (2013.01); *H01M 2004/027* (2013.01)

(58) Field of Classification Search
CPC ........... H01M 2004/027; H01M 2/145; H01M 2/1653; H01M 4/134; H01M 4/366; H01M 4/382; H01M 4/628; Y02E 60/10
See application file for complete search history.

(56) References Cited

U.S. PATENT DOCUMENTS

| | | | |
|---|---|---|---|
| 2008/0026297 A1* | 1/2008 | Chen | H01M 10/052 429/341 |
| 2010/0009249 A1* | 1/2010 | Tojo | H01M 2/1653 429/129 |
| 2010/0092864 A1 | 4/2010 | Yokomizo et al. | |
| 2011/0003210 A1 | 1/2011 | Lim et al. | |

FOREIGN PATENT DOCUMENTS

| | | |
|---|---|---|
| EP | 0696822 A1 | 2/1996 |
| EP | 0743690 A1 | 11/1996 |
| EP | 2079119 A1 | 7/2009 |
| JP | 7-173765 A | 7/1995 |
| JP | 8-315800 | 11/1996 |
| JP | 9-124813 A | 5/1997 |
| JP | 10-27598 A | 1/1998 |
| JP | 2002-194125 A | 7/2002 |
| KR | 10-2004-0067620 A | 7/2004 |
| KR | 10-2004-0075199 A | 8/2004 |
| KR | 10-2011-0003131 A | 1/2011 |
| KR | 10-1313458 B1 | 10/2013 |
| KR | 10-1410047 B1 | 7/2014 |
| WO | WO 2004/038833 A1 | 5/2004 |
| WO | WO 2008/044761 A1 | 4/2008 |

OTHER PUBLICATIONS

International Search Report (PCT/ISA/210) issued in PCT/KR2017/005651, dated Aug. 31, 2017.

European Patent Office Action dated Nov. 16, 2020 for EP Application No. 17 806 988.6.

* cited by examiner

SEPARATOR FOR LITHIUM SECONDARY BATTERY AND LITHIUM SECONDARY BATTERY INCLUDING THE SAME

TECHNICAL FIELD

Cross-Reference to Related Applications

This application claims priority to and the benefit of Korean Patent Application Nos. 10-2016-0066720, filed on May 30, 2016, and 10-2017-0066899, filed on May 30, 2017, the disclosure of which is incorporated herein by reference in its entirety.

TECHNICAL FIELD

The present invention relates to a separator for a lithium secondary battery and a lithium secondary battery including the same, and more particularly, to a separator for a lithium secondary battery which may enhance lifespan characteristics and safety of a lithium secondary battery and a lithium secondary battery including the same.

BACKGROUND ART

In line with an increase in technology development of and demand for mobile devices, demand for secondary batteries as energy sources is rapidly increasing. Among these secondary batteries, lithium secondary batteries which have high energy density and operating voltage, a long cycle lifespan, and a low self-discharge rate are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively conducted.

As power sources of these EVs, HEVs, and the like, nickel-metal hydride (Ni-MH) secondary batteries or lithium secondary batteries which have high energy density, high discharge voltage, and high power output stability are used. In a case in which a lithium secondary battery is used in EVs, long-term use for 10 years or more under harsh conditions, in addition to high energy density and high power output in a short time, are required, and thus much higher energy density and safety and superior long-term lifespan characteristics than those of existing small lithium secondary batteries are necessarily required.

A lithium secondary battery is generally manufactured by assembling a negative electrode, a positive electrode, and a separator between the negative electrode and the positive electrode.

In lithium secondary batteries, a positive electrode active material constituting a positive electrode may be a metal oxide such as $LiCoO_2$, $LiMnO_2$, $LiMn_2O_4$, or $LiCrO_2$, and a negative electrode active material constituting a negative electrode may be a carbon-based material such as metal lithium, graphite, activated carbon, or the like, or a material such as silicon oxide ($SiO_x$) or the like.

A negative electrode of a lithium secondary battery is formed of lithium metal, a carbon-based compound capable of reversibly intercalating and deintercalating lithium ions, or the like. Among these, when lithium metal is used, a phenomenon, in which lithium atoms are grown on a surface of the metal lithium as cycles of charging and discharging proceed, and thus a separator is damaged, resulting in breakdown of a battery, more frequently occurs.

Therefore, there is a need to develop a novel technology for addressing the above-described problems of the negative electrode.

DISCLOSURE OF THE INVENTION

Technical Problem

The present invention provides a separator for a lithium secondary battery which prevents the formation of dendrite lithium at a negative electrode and thus the stability of a lithium secondary battery may be enhanced.

The present invention also provides a lithium secondary battery including the above-described separator.

The present invention also provides a method of manufacturing the above-described separator.

Technical Solution

According to an embodiment of the present invention, there is provided a separator for a lithium secondary battery, including a porous resin comprising one or more polar functional groups selected from the group consisting of —C—F; and —C—OOH and —C═O on a surface thereof, wherein, among the polar functional groups, a molar ratio of —C—OOH and —C═O to —C—F ranges from 0.2:0.8 to 0.8:0.2.

According to another embodiment of the present invention, there is provided a lithium secondary battery including the above-described separator.

According to another embodiment of the present invention, there is provided a method of manufacturing a separator for a lithium secondary battery, including: (1) preparing a gas mixture by mixing $N_2$ gas, $O_2$ gas, or a mixture thereof with $F_2$ gas; and (2) bringing the gas mixture into contact with a porous resin to form a polar functional group on a surface of the porous resin.

Advantageous Effects

A separator for a lithium secondary battery according to the present invention includes a porous resin comprising a polar functional group on a surface thereof, and thus the polar functional group forms an insoluble lithium salt layer on a surface of a negative electrode, thereby inhibiting the formation of dendrite lithium on the surface of the negative electrode, whereby lifespan characteristics and safety of a lithium secondary battery including the separator can be enhanced.

MODE FOR CARRYING OUT THE INVENTION

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

A separator for a lithium secondary battery, according to the present invention, includes a porous resin comprising one or more polar functional groups selected from the group consisting of —C—F; and —C—OOH and —C=O on a surface thereof, in which, among the polar functional groups, a molar ratio of —C—OOH and —C=O to —C—F ranges from 0.2:0.8 to 0.8:0.2.

The separator for a lithium secondary battery, according to the present invention, may be formed of the porous resin, and the porous resin includes one or more polar functional groups selected from the group consisting of —C—F; and —C—OOH and —C=O, and thus, during charging of a lithium secondary battery including the separator, the polar functional group may be reduced or electrochemically carbonized around about 0.9 V to about 1.5 V (vs. $Li/Li^+$), thereby forming an insoluble lithium salt layer (inorganic protective film).

At this time, the reaction may occur according to, for example, one of the reaction schemes (1) to (3) below:

Reduction reaction between a surface functional group and lithium $$mLi^+ + x(\text{—C—F})@\text{surface} \to (m-1)Li^+ + x(\text{—C—})@\text{surface} + xLiF \quad (1)$$

$$mLi^+ + x(\text{—C=O})@\text{surface} \to (m-2)Li^+ + x(\text{—C—})@\text{surface} + xLi_2 \quad (2)$$

$$mLi^+ + x(\text{—C—OOH})@\text{surface} \to (m-3)Li^+ + x(\text{—C—})@\text{surface} + xLi_2O + xLiOH \quad (3)$$

When the insoluble lithium salt layer is formed on a surface of a negative electrode, the formation of dendrite lithium on the surface of the negative electrode may be suppressed. In particular, a case in which a lithium secondary battery including the separator for a lithium secondary battery according to an embodiment of the present invention comprises a lithium metal as the negative electrode will be described as an example. When lithium is deposited at a defect point of the lithium metal, there is a problem such as effective formation of dendrite lithium due to the concentration of effective current density. However, when such an insoluble lithium salt is formed on a surface of lithium metal, the formation of dendrite may be suppressed.

The content of the polar functional group in the porous resin may range from 0.7 $mol/cm^2$ to 6 $mol/cm^2$, in particular, 1.8 $mol/cm^2$ to 3 $mol/cm^2$, with respect to a surface area of the porous resin.

When the polar functional group included in the porous resin accounts for 0.7 $mol/cm^2$ or more of the surface elements of the porous resin, the polar functional group may be reduced and decomposed to an appropriate extent on the surface of a negative electrode, thereby appropriately forming an insoluble lithium salt layer on a surface of lithium metal. On the other hand, when the polar functional group included in the porous resin accounts for greater than 6 $mol/cm^2$ of the surface elements of the porous resin, the insoluble lithium salt layer formed on the surface of a negative electrode is excessively thick, and thus the transfer of lithium ions may be hindered.

The polar functional group may be present in a region ranging from 0.01 μm to 1 μm, in particular, 0.01 μm to 0.5 μm, more particularly, 0.01 μm to 0.3 μm, from a surface of the porous resin toward the center thereof.

When the polar functional group is present only in a region less than 0.01 μm from the surface of the porous resin toward the center thereof, it is difficult for the separator to include an appropriate amount of the polar functional group. When the polar functional group is present in a region greater than 1 μm from the surface of the porous resin toward the center thereof, it is difficult to smoothly form the insoluble lithium salt layer on the surface of a negative electrode.

In addition, a total amount of the polar functional groups included in the porous resin may range from 0.1 wt % to 2 wt %, in particular, 0.2 wt % to 0.8 wt %, based on 100 wt % of the separator for a lithium secondary battery.

When the total amount of the polar functional groups included in the porous resin is 0.1 wt % or more based on 100 wt % of the separator for a lithium secondary battery, the polar functional group may be appropriately reduced and decomposed on the surface of lithium metal, thereby appropriately forming the insoluble lithium salt layer on the surface of lithium metal. When the total amount of the polar functional groups included in the porous resin is 2 wt % or less based on 100 wt % of the separator for a lithium secondary battery, it may prevent the interference with transfer of lithium ions due to a excessive increase in the thickness of the insoluble lithium salt layer.

Among the polar functional groups, a molar ratio of —C—OOH and —C=O to —C—F may range from 0.2:0.8 to 0.8:0.2, in particular, 0.3:0.7 to 0.7:0.3, more particularly, 0.4:0.6 to 0.6:0.4.

When a total number of moles of C—OOH and —C=O is greater than 0.8 with respect to 0.2 moles of —C—F among the polar functional groups, a LiF lithium salt is not sufficiently formed, and when a total number of moles of C—OOH and —C=O is less than 0.2 with respect to 0.8 moles of —C—F among the polar functional groups, the LiF lithium salt is excessively formed.

The porous resin may be formed of any one selected from the group consisting of high-density polyethylene, linear low-density polyethylene, low-density polyethylene, ultra-high-molecular-weight polyethylene, polypropylene, polyethylene terephthalate, polybutylene terephthalate, polyester, polyacetal, polyamide, polycarbonate, polyimide, polyether ether ketone, polyethersulfone, polyphenylene oxide, polyphenylene sulfide, and polyethylene naphthalene, or a mixture of two or more thereof. In particular, the porous resin may be a polyolefin resin such as high-density polyethylene, linear low-density polyethylene, low-density polyethylene, ultra-high-molecular-weight polyethylene, or polypropylene.

A pore size and porosity of the porous resin are not particularly limited, but the porosity of the porous resin may range from 5% to 95%, and the pore size (diameter) of the porous resin may range from 0.01 µm to 10 µm. When the pore size and the porosity are 0.01 µm or more and 5% or more, respectively, an electrolytic solution is smoothly transferred and thus battery performance does not deteriorate. When the pore size and the porosity are 10 µm or less and 95% or less, respectively, mechanical and physical properties of the porous resin may be appropriately maintained, and an internal short-circuit between a positive electrode and a negative electrode may be prevented. In addition, the thickness of the porous resin is not particularly limited, but may range from 1 µm to 300 µm, preferably, 5 µm to 100 µm. When the thickness of the porous resin is 1 µm or more, appropriate mechanical and physical properties may be obtained, and, when the thickness of the porous resin is 300 µm or less, it is possible to prevent the separator including the porous resin from acting as a resistance layer.

The separator for a lithium secondary battery may be used in manufacture of a lithium secondary battery, and thus the present invention provides a lithium secondary battery including the above-described separator.

As described above, the one or more polar functional groups selected from the group consisting of —C—F; and —C—OOH and —C=O, included on the surface of the porous resin included in the separator for a lithium secondary battery, may be reduced and decomposed during charging of the lithium secondary battery, thereby forming an insoluble lithium salt layer (inorganic protective film) on a surface of a negative electrode.

The insoluble lithium salt may be one or more selected from the group consisting of lithium fluoride (LiF), lithium carbonate ($Li_2CO_3$), lithium oxide ($Li_2O$), lithium oxalate ($Li_2C_2O_4$), and lithium hydroxide (LiOH), in particular, LiF.

The insoluble lithium salt layer may have a thickness of 0.001 µm to 0.5 µm, in particular, 0.005 µm to 0.1 µm.

When the thickness of the insoluble lithium salt layer is 0.001 µm or more, the insoluble lithium salt layer may appropriately act as an inorganic protective film on the surface of lithium metal, thereby suppressing the formation of lithium dendrites. When the thickness of the insoluble lithium salt layer is 0.5 µm or less, problems do not occur in the smooth transfer and passage of lithium ions.

The separator for a lithium secondary battery, according to the present invention, may be manufactured using a method including: (1) preparing a gas mixture by mixing $N_2$ gas, $O_2$ gas, or a mixture thereof with $F_2$ gas; and (2) bringing the gas mixture into contact with a porous resin to form a polar functional group on a surface of the porous resin.

In the preparing of the gas mixture (process (1)), a pressure ratio of the $F_2$ gas to the $N_2$ gas, the $O_2$ gas, or the mixture thereof may range from 7.5:2.5 to 9.4:0.6, in particular, 8:2 to 9:1, more particularly, 8.5:1.5 to 9:1.

In the preparing of the gas mixture (process (1)), when the $N_2$ gas, the $O_2$ gas, or the mixture thereof and the $F_2$ gas are mixed at a pressure ratio of the $F_2$ gas to the $N_2$ gas, the $O_2$ gas of 7.5:2.5 to 9.4:0.6, an appropriate amount of —C—F as the polar functional group may be formed on the surface of the porous resin included in the separator for a lithium secondary battery, i.e., may be formed to satisfy a molar ratio of —C—OOH and —C=O to —C—F of 0.2:0.8 to 0.8:0.2.

In addition, in the preparing of the gas mixture (process (1)), the $N_2$ gas and the $O_2$ gas may be mixed at a pressure ratio of 1:9 to 9:1, in particular, 1.5:8.5 to 8.5:1.5, more particularly, 8:2 to 7:3. That is, the preparing of the gas mixture (process (1)) may be performed by mixing a mixture of the $N_2$ gas and the $O_2$ gas at a pressure ratio of 1:9 to 9:1, in particular, 1.5:8.5 to 8.5:1.5, more particularly, 8:2 to 7:3 with the $F_2$ gas.

When the $O_2$ gas has a pressure of greater than 9 based on the $N_2$ gas at 1, problems in terms of manufacturing safety according to heat, combustion, fire, and the like may occur.

The bringing of the gas mixture into contact with a porous resin (process (2)) includes bringing the gas mixture into contact with the above-described porous resin. In one embodiment of the present invention, the bringing of the gas mixture into contact with a porous resin may include placing the porous resin in a container such as a pressure chamber or the like, and adding the gas mixture thereto at a pressure of 1 KPa to 60 KPa, in particular, 5 KPa to 50 KPa.

When the porous resin is placed in a container such as a pressure chamber or the like and the gas mixture is added thereto, the gas mixture is diffused onto a surface of the porous resin, and thus a reaction occurs. Since the reaction occurs by diffusion of gas with respect to the surface of a solid, a layer that is surface-modified with a polar functional group may be uniformly formed on the surface of the porous resin.

When the pressure of the gas mixture is less than 1 KPa, the surface of the porous resin may not be smoothly modified with a polar functional group, and, when the pressure of the gas mixture is greater than 60 KPa, problems in terms of manufacturing safety according to heat, combustion, fire, and the like may occur.

The bringing of the gas mixture into contact with a porous resin may be performed at a temperature of 0° C. to 100° C., in particular, 20° C. to 25° C. for 1 minute to 240 minutes, in particular, 10 minutes to 30 minutes.

When the contact temperature is outside the range of 0° C. to 100° C., the porous separator may contract. When the contact time is less than 1 minute, the amount of the formed functional group may be insufficient, and, when the contact time is greater than 240 minutes, an excess amount of —C—F may be formed.

After process (2), an additional reaction with a $H_2O$-containing gas, in particular, gaseous $H_2O$, may be attained.

In particular, the reaction with a $H_2O$-containing gas may be attained when the gas mixture prepared in process (1) above includes $O_2$ gas. Specifically, when the gas mixture prepared in process (1) above includes $O_2$ gas, a —C—H bond on the surface of the porous resin reacts with $O_2$ to form a peroxy radical (—OO·), and thus the peroxy radical may be subjected to conversion to hydroxy-peroxide (—O—OH) or a carbonyl (—C=O) group through the reaction with $H_2O$ gas.

Figure 1:
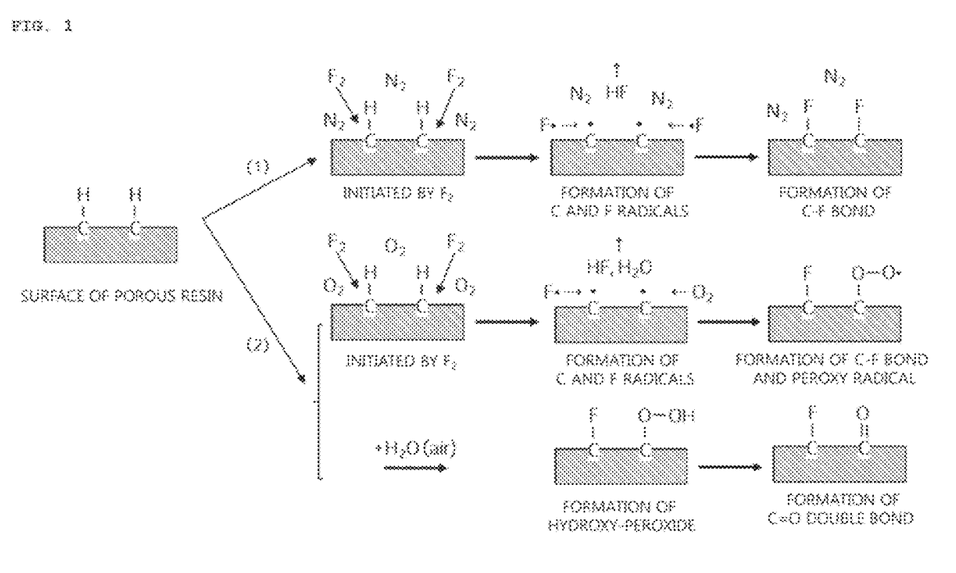
FIG. 1 is a diagram illustrating a process of forming a polar functional group on a surface of a porous resin by treating the surface of the porous resin with a gas mixture prepared by mixing $N_2$ gas, $O_2$ gas, or a mixture thereof with $F_2$ gas.
Figure 2:
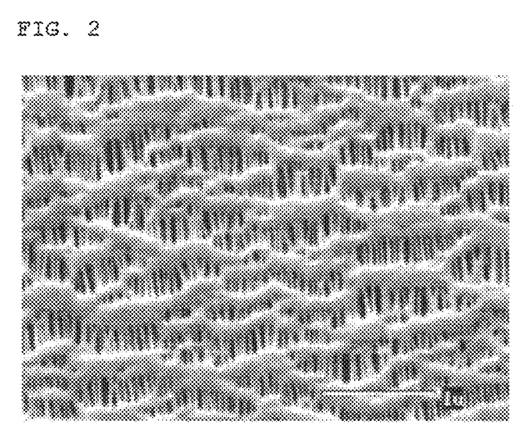
FIG. 2 is a scanning electron microscope (SEM) image of a surface of a porous resin that may be included in a separator for a lithium secondary battery.
Figure 3:
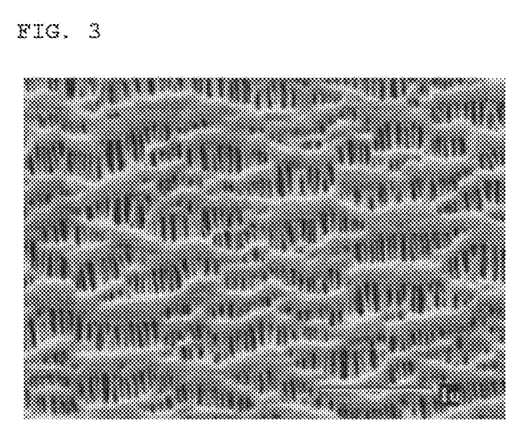
FIG. 3 is an SEM image showing a surface of a porous resin at which a polar functional group included in a separator for a lithium secondary battery according to Example 1 of the present invention is formed.

FIG. 1 is a diagram illustrating a process of forming a polar functional group on a surface of a porous resin by treating the surface of the porous resin with a gas mixture prepared by mixing $N_2$ gas, $O_2$ gas, or a mixture thereof with $F_2$ gas.

Referring to FIG. 1, (1) illustrates a state in which, when treating a porous resin including a polyolefin with a mixture of $F_2$ gas and $N_2$ gas, a polar functional group is formed on a surface of the porous resin, and (2) illustrates a state in which, when treating a porous resin including a polyolefin with a mixture of $F_2$ gas and $O_2$ gas, a polar functional group is formed on a surface of the porous resin. As illustrated in FIG. 1, —C—H on the surface of the porous resin may be modified by each of the $F_2$ gas, $N_2$ gas, and $O_2$ gas, and the formed polar functional groups may vary according to the type of gas, and thus, to form desired types of polar functional groups at a desired ratio, the porous resin needs to be treated by adjusting partial pressures of the $F_2$ gas, the $N_2$ gas, and the $O_2$ gas.

Meanwhile, in the present invention, the lithium secondary battery may include a positive electrode, a negative electrode, and a separator between the positive electrode and the negative electrode.

The positive electrode may be manufactured using a method commonly known in the art. For example, the positive electrode may be manufactured by preparing a slurry by mixing a positive electrode active material with a solvent and, according to need, a binder, a conductive material, and a dispersant and stirring the resulting mixture, coating a current collector made of a metal material with the slurry, and pressing and drying the resulting current collector.

The current collector is formed of a metal with high conductivity and is not particularly limited as long as it is a metal to which the positive electrode active material slurry can be easily adhered, does not cause a chemical change in the fabricated battery within a voltage range of the battery, and has high conductivity. For example, the current collector may be formed of stainless steel, aluminum, nickel, titanium, calcined carbon, or aluminum or stainless steel that is surface-treated with carbon, nickel, titanium, silver, or the like. In addition, the current collector may have fine irregularities on a surface thereof to increase adhesion between the current collector and the positive electrode active material. The current collector may be used in any of various forms including films, sheets, foils, nets, porous structures, foams, non-woven fabrics, and the like, and may have a thickness of 3 μm to 500 μm.

Examples of the positive electrode active material include, but are not limited to, lithium cobalt oxide (LiCoO$_2$); lithium nickel oxide (LiNiO$_2$); Li[Ni$_a$Co$_b$Mn$_c$M$^1_d$]O$_2$ where M$^1$ is any one selected from the group consisting of Al, Ga, and In or two or more of these elements, 0.3≤a<1.0, 0≤b≤0.5, 0≤c≤0.5, 0≤d≤0.1, and a+b+c+d=1; layered compounds such as Li(Li$_e$M$^2_{f-e-f'}$M$^3_{f'}$)O$_{2-g}$A$_g$ where 0≤e≤0.2, 0.6≤f≤1, 0≤f'≤0.2, and 0≤g≤0.2, M$^2$ includes Mn and one or more selected from the group consisting of Ni, Co, Fe, Cr, V, Cu, Zn, and Ti, M$^3$ is one or more selected from the group consisting of Al, Mg, and B, and A is one or more selected from the group consisting of P, F, S, and N, or compounds substituted with one or more transition metals; lithium manganese oxides such as Li$_{1+h}$Mn$_{2-h}$O$_4$ where 0≤h≤0.33, LiMnO$_3$, LiMn$_2$O$_3$, and LiMnO$_2$; lithium copper oxide (Li$_2$CuO$_2$); vanadium oxides such as LiV$_3$O$_8$, V$_2$O$_5$, and Cu$_2$V$_2$O$_7$; Ni-site type lithium nickel oxides having the formula LiNi$_{1-i}$M$^4_i$O$_2$ where M$^4$=Co, Mn, Al, Cu, Fe, Mg, B or Ga, and 0.01≤i≤0.3); lithium manganese composite oxides having the formula LiMn$_{2-j}$M$^5_j$O$_2$ where M$^5$=Co, Ni, Fe, Cr, Zn, or Ta, and 0.01≤j≤0.1) or the formula Li$_2$Mn$_3$M$^6$O$_8$ where M$^6$=Fe, Co, Ni, Cu, or Zn; LiMn$_2$O$_4$ where some of the Li atoms are substituted with alkaline earth metal ions; disulfide compounds; LiFe$_3$O$_4$; and Fe$_2$(MoO$_4$)$_3$.

The solvent used for fabricating the positive electrode may be an organic solvent such as N-methyl pyrrolidone (NMP), dimethyl formamide (DMF), acetone, dimethyl acetamide, or the like, water, or the like, and these solvents may be used alone or two or more of these solvents may be used in combination. The solvent may be used in a sufficient amount to dissolve and disperse the positive electrode active material, the binder, and the conductive material in consideration of the thickness of the slurry to be applied and manufacturing yield.

The binder may be various types of binder polymers, such as a polyvinylidenefluoride-hexafluoropropylene copolymer (PVdF-co-HFP), polyvinylidenefluoride, polyacrylonitrile, polymethylmethacrylate, polyvinyl alcohols, carboxymethylcellulose (CMC), starch, hydroxypropylcellulose, regenerated cellulose, polyvinyl pyrrolidone, tetrafluoroethylene, polyethylene, polypropylene, polyacrylic acid, ethylene-propylene-diene monomers (EPDMs), sulfonated EPDMs, styrene-butadiene rubber (SBR), fluorine rubber, polymers obtained by substituting hydrogen atoms of the aforementioned materials with Li, Na, Ca, or the like, various copolymers, or the like.

The conductive material is not particularly limited so long as it does not cause chemical changes in the fabricated battery and has conductivity. Examples of conductive materials include, but are not limited to, graphite such as natural or artificial graphite; carbon black such as acetylene black, Ketjen black, channel black, furnace black, lamp black, and thermal black; conductive fibers such as carbon fibers and metallic fibers; conductive tubes such as carbon nanotubes; metallic powders such as carbon fluoride powder, aluminum powder, and nickel powder; conductive whiskers such as zinc oxide and potassium titanate; conductive metal oxides such as titanium oxide; and polyphenylene derivatives. The dispersant may be a water-based dispersant or an organic dispersant such as N-methyl-2-pyrrolidone, or the like.

The negative electrode may be manufactured using a method commonly used in the art.

The negative electrode may generally use, as a negative electrode active material, a carbon material capable of intercalating and deintercalating lithium ions, a silicon-based material, tin, or the like, or may also be formed of lithium metal.

For example, when the negative electrode includes lithium metal, the lithium metal may be in a lithium metal foil form, or the negative electrode may be manufactured by depositing the lithium metal onto a current collector, coating a current collector with liquid metal, attaching a lithium metal film to a current collector, or the like.

In addition, when the negative electrode includes, as a negative electrode active material, a carbon material capable of intercalating and deintercalating lithium ions, a silicon-based material, tin, or the like, the negative electrode may be manufactured by preparing a negative electrode active material slurry by mixing a negative electrode active material and additives such as a binder, a conductive material, and the like and stirring the resulting mixture, coating a negative electrode current collector with the negative electrode active material slurry, and drying and pressing the resulting negative electrode current collector.

When the negative electrode includes a carbon material as a negative electrode active material, non-limiting examples of the carbon material include low-crystalline carbon and high-crystalline carbon. Representative examples of the low-crystalline carbons include soft carbon and hard carbon, and examples of the high-crystalline carbon include natural graphite, Kish graphite, pyrolytic carbon, mesophase pitch based carbon fiber, meso-carbon microbeads, mesophase pitches, and high-temperature calcined carbon such as petroleum or coal tar pitch derived cokes, and the like. Examples of the silicon-based material include silicon, silicon oxide particles (SiO$_x$ where 0<x≤2), Si-metal alloys, and alloys of Si and silicon oxide particles (SiO$_x$ where 0<x≤2).

A solvent for fabricating the negative electrode may be an organic solvent such as N-methyl pyrrolidone (NMP), dimethyl formamide (DMF), acetone, dimethyl acetamide, or the like, water, or the like, and these solvents may be used alone or two or more of these solvents may be used in combination. The solvent may be used in a sufficient amount to dissolve and disperse the negative electrode active material, the binder, and the conductive material in consideration of the thickness of the slurry coated and manufacturing yield.

The binder may be used to bind negative electrode active material particles together to maintain the molded product, and is not particularly limited so long as it is a binder commonly used in preparation of a slurry for an negative electrode active material. For example, the binder may be a non-aqueous binder such as polyvinyl alcohols, carboxymethylcellulose, hydroxypropylenecellulose, diacetylenecellulose, polyvinylchloride, polyvinylpyrrolidone, polytetrafluoroethylene (PTFE), polyvinylidenefluoride (PVdF), polyethylene, polypropylene, or the like. In addition, the binder may be an aqueous binder such as one selected from the group consisting of acrylonitrile-butadiene rubber, styrene-butadiene rubber, and acryl rubber or a mixture of two or more of these materials. Aqueous binders are more economical and more environmentally-friendly, and exhibit higher binding effects, compared to non-aqueous binders, and cause no harm to the health of an operator, and thus may increase the percentage of an active material per the same volume, which enables high-capacity, and the aqueous binder is preferably styrene-butadiene rubber.

The conductive material is not particularly limited so long as it does not cause chemical changes in the fabricated battery and has conductivity. Examples of conductive materials include, but are not limited to, graphite such as natural or artificial graphite; carbon black such as acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

A negative electrode current collector used in the negative electrode according to an embodiment of the present invention may have a thickness of 3 μm to 500 μm. The negative electrode current collector is not particularly limited so long as it does not cause chemical changes in the fabricated battery and has conductivity. For example, the negative electrode current collector may be made of copper, gold, stainless steel, aluminum, nickel, titanium, calcined carbon, copper or stainless steel surface-treated with carbon, nickel, titanium, silver, or the like, aluminum-cadmium alloys, or the like. In addition, the negative electrode current collector may have fine irregularities on a surface thereof to increase adhesion between the negative electrode active material and the negative electrode current collector, and may be used in any of various forms including films, sheets, foils, nets, porous structures, foams, non-woven fabrics, and the like.

A lithium salt that may be included as an electrolyte used in the present invention may be any lithium salt that is commonly used in an electrolyte for a lithium secondary battery without limitation, and the lithium salt may be, for example, any one selected from the group consisting of, as anions, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In an electrolytic solution used in the present invention, an organic solvent included in the electrolytic solution may be any organic solvent that is commonly used in an electrolytic solution for a secondary battery without limitation. As representative examples of the organic solvent, any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxy ethane, diethoxy ethane, vinylene carbonate, sulfolane, γ-butyrolactone, propylene sulfite, and tetrahydrofuran, a mixture of two or more of these materials, or the like may be used. In particular, among the carbonate-based organic solvents, ethylene carbonate and propylene carbonate, which are a type of cyclic carbonate, may be used due to high permittivity as a high-viscosity organic solvent, thus satisfactorily dissociating a lithium salt. When such a cyclic carbonate is used in combination with a low-viscosity, low-permittivity linear carbonate, such as dimethyl carbonate and diethyl carbonate, at an appropriate ratio, an electrolytic solution having high electrical conductivity may be prepared, and thus such cyclic carbonates are more preferably used.

Optionally, the electrolytic solution stored according to the present invention may further include additives such as an overcharge inhibitor, and the like that are included in general electrolytic solutions.

A shape of the lithium secondary battery of the present invention is not particularly limited, but may be a cylindrical shape using a can, a rectangular shape, a pouch shape, a coin shape, or the like.

The lithium secondary battery may be used in battery cells used as power sources of small devices, and may be a unit battery of medium- and large-sized battery modules used in battery modules or medium- and large-sized devices including a plurality of battery cells.

Examples of the medium- and large-sized devices include, but are not limited to, electric vehicles, hybrid electric vehicles, plug-in hybrid electric vehicles, and power storage systems.

EXAMPLES

Hereinafter, the present invention will be described in further detail with reference to examples and experimental examples, but these examples are not intended to limit the present invention. Examples according to the present invention may be changed in many different forms, and the scope of the present invention should not be construed as being limited to the examples described below. The examples of the present invention are provided merely to more completely explain the present invention to those of ordinary skill in the art.

Example 1

Figure 4:
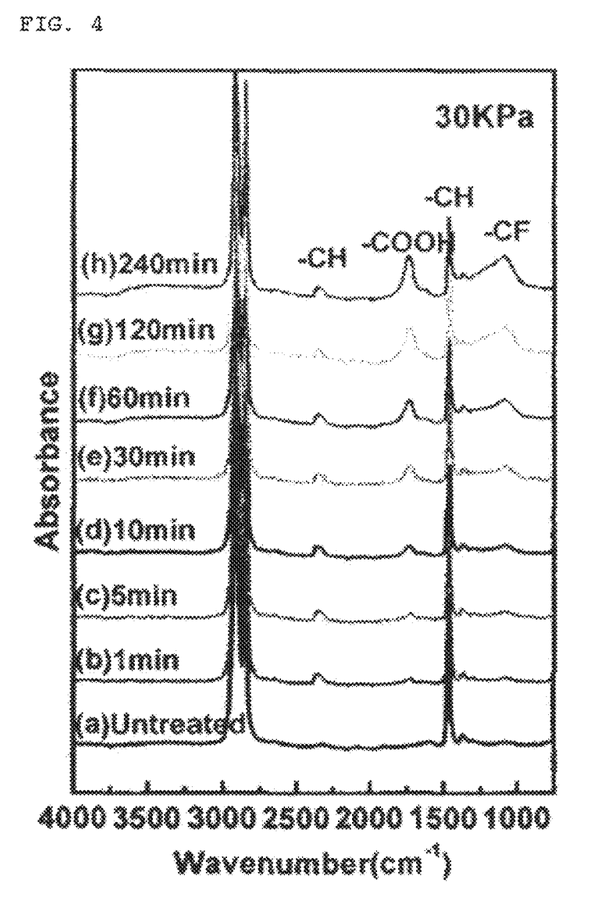
FIGS. 4 and 5 illustrate Fourier transform-attenuated total reflection (FT-ATR) results of porous separators manufactured in Examples 1 and 2, respectively.

To introduce polar functional groups, i.e., —C—F, C═O, and —C—OOH, to a surface of a porous separator, the porous separator was treated with a gas mixture of $F_2$ gas, $O_2$ gas, and $N_2$ gas, concentrations of which were adjusted with a partial pressure ratio. All reaction lines including a reaction chamber or a reaction tube were made of a SUS-316 material which has corrosion resistance to $F_2$ gas at room temperature. $O_2$ gas and $N_2$ gas, to be mixed with $F_2$ gas, were mixed in a ratio of 2:8 similarly to the composition of air, and the F$_2$ gas and the mixture of O$_2$ gas and N$_2$ gas were mixed in a buffer tank in a partial pressure ratio of 1:9, thereby preparing a gas mixture. The porous separator (polypropylene/polyethylene/polypropylene) was placed in the reaction chamber, and the gas mixture was added thereto. The concentration of the gas mixture was adjusted using a gas valve positioned between the buffer tank and the reaction chamber in a vacuum state so as to satisfy a pressure condition of 30 KPa, and the reaction time was adjusted to 20 minutes. Among the polar functional groups, a molar ratio of —C—OOH and —C═O to —C—F was 0.6:0.4. FIG. 4 illustrates illustrate Fourier transform-attenuated total reflection (FT-ATR) results of the porous separator of Example 1.

Example 2

Figure 5:
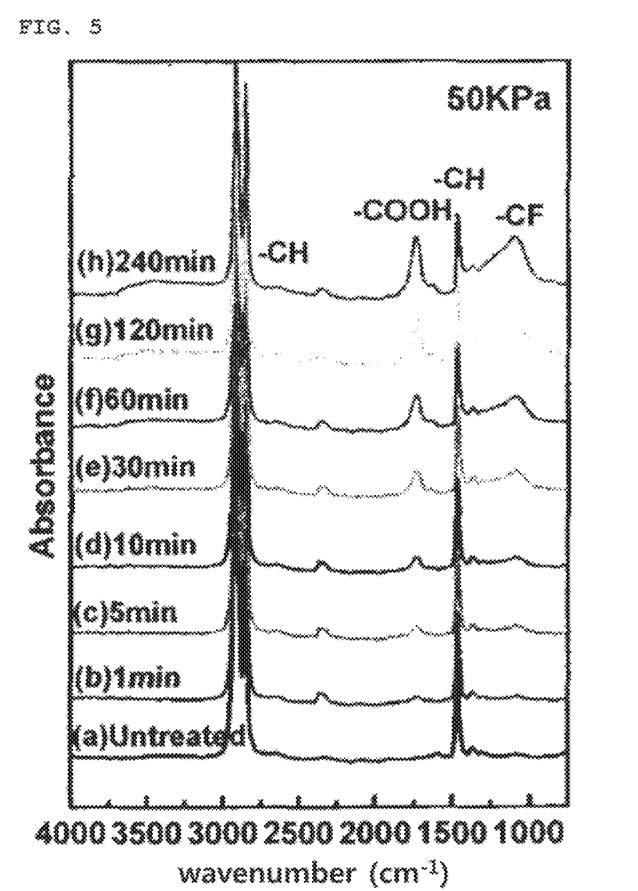

Polar functional groups of —C—F, C═O, and —C—OOH were introduced to a surface of a porous separator in the same manner as in Example 1, except that the pressure condition of the gas mixture was 50 KPa instead of 30 KPa. Among the polar functional groups, a molar ratio of —C—OOH and —C═O to —C—F was 0.6:0.4. FIG. 5 illustrates illustrate FT-ATR results of the porous separator of Example 2.

Example 3

Polar functional groups of —C—F, C═O, and —C—OOH were introduced to a surface of a porous separator in the same manner as in Example 1, except that the F$_2$ gas and the mixture of O$_2$ gas and N$_2$ gas were mixed in a buffer tank in a partial pressure ratio of 2:8 to prepare a gas mixture. Among the polar functional groups, a molar ratio of —C—OOH and —C═O to —C—F was 0.8:0.2.

Example 4: Manufacture of Coin-Type Half-Cell

A positive electrode slurry mixture was prepared by adding 94 wt % of LiCoO$_2$ as a positive electrode active material, 3 wt % of carbon black as a conductive agent, and 3 wt % of PVdF as a binder to N-methyl-2-pyrrolidone (NMP) as a solvent. The positive electrode slurry mixture was applied onto Al foil having a thickness of about 20 μm as a positive electrode current collector and dried, followed by roll pressing, thereby completing fabrication of a positive electrode.

The separator (treatment time: 60 minutes) manufactured in Example 1 was disposed between the positive electrode and a negative electrode, which is Li metal, and then an electrolytic solution, prepared by dissolving 1M LiPF$_6$ in a mixed solvent of ethylene carbonate (EC) and diethyl carbonate (DEC) in a volume ratio of 50:50, was injected thereinto, thereby completing manufacture of a coin-type half-cell.

Examples 5 and 6: Manufacture of Coin-Type Half-Cells

Coin-type half-cells were manufactured in the same manner as in Example 4, except that the separators manufactured in Examples 2 and 3, respectively, were used instead of the separator of Example 1.

Comparative Example 1

Polar functional groups of —C—F, C═O, and —C—OOH were introduced to a surface of a porous separator in the same manner as in Example 1, except that the F$_2$ gas and the mixture of O$_2$ gas and N$_2$ gas were mixed in a buffer tank in a partial pressure ratio of 3:7 to prepare a gas mixture. Among the polar functional groups, a molar ratio of —C—OOH and —C═O to —C—F was 0.9:0.1.

Comparative Example 2

Polar functional groups of —C—F, C═O, and —C—OOH were introduced to a surface of a porous separator in the same manner as in Example 2, except that the F$_2$ gas and the mixture of O$_2$ gas and N$_2$ gas were mixed in a buffer tank in a partial pressure ratio of 0.5:9.5 to prepare a gas mixture. Among the polar functional groups, a molar ratio of —C—OOH and —C═O to —C—F was 0.1:0.9.

Comparative Example 3: Manufacture of Coin-Type Half-Cell

A coin-type half-cell was manufactured in the same manner as in Example 4, except that a porous separator (polypropylene/polyethylene/polypropylene), into which functional groups were not introduced, was used instead of the separator of Example 1.

Comparative Examples 4 and 5: Manufacture of Coin-Type Half-Cells

Coin-type half-cells were manufactured in the same manner as in Example 4, except that the separators manufactured in Comparative Examples 1 and 2, respectively, were used instead of the separator of Example 1.

Experimental Example 1

Figure 6:
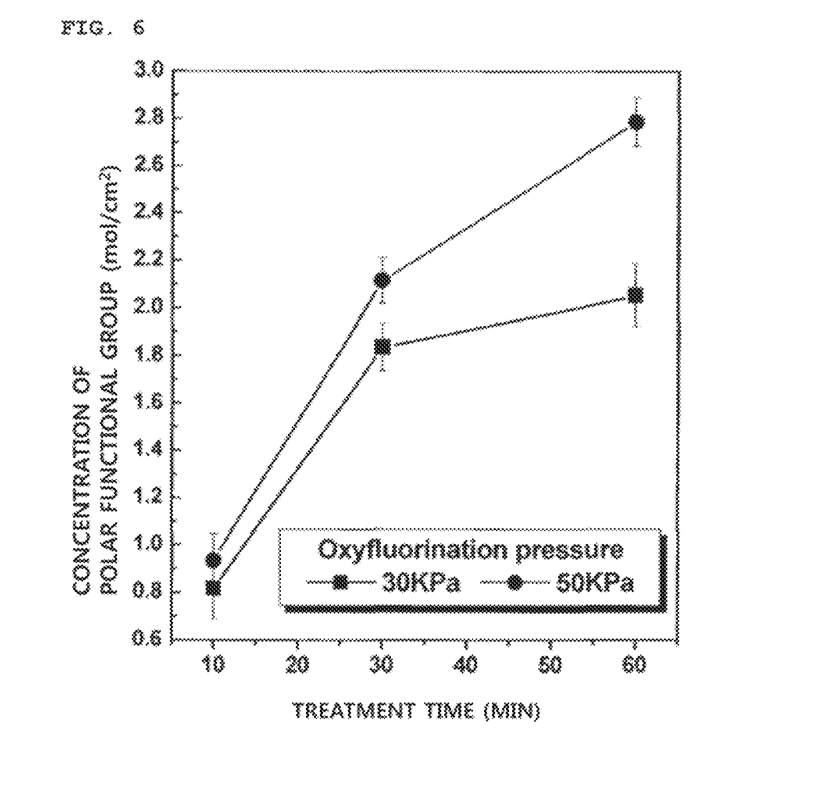
FIG. 6 is a graph showing measurement results of concentrations per area of polar functional groups of each of the porous separators of Examples 1 and 2, into which the polar functional groups were introduced.

FIGS. 4 and 5 illustrate FT-ATR results of the porous separators manufactured in Examples 1 and 2, respectively, into which the polar functional groups were introduced. In addition, measurement results of concentrations per area of the polar functional groups of each of the porous separators of Examples 1 and 2, into which the polar functional groups were introduced, are shown in FIG. 6.

Referring to FIGS. 4 and 5, as the concentration and treatment time of the gas mixture increased, peaks of the polar functional groups corresponding to —C—F, and —C═O and —C—OOH tended to increase. In addition, referring to FIG. 6, similarly to the above-described FT-ATR results, as the concentration and treatment time of the gas mixture increased, molar concentrations per area of the polar functional groups corresponding to —C—F, and —C═O and —C—OOH of the porous separator increased. At this time, the concentration range was between about 1.8 mol/cm$^2$ and about 3.0 mol/cm$^2$.

Experimental Example 2

Meanwhile, the weight of each of the porous separators of Examples 1 and 2, into which the polar functional groups were introduced, was measured, and then each porous separator was dissolved in N,N-dimethylacetamide as a solvent to remove the polar functional groups therefrom, and then the weight of the resulting porous separator was measured, thereby calculating a weight loss rate, which was used for measurement of the total amount of the polar functional groups. At this time, an additional experiment, in which the polar functional groups of —C—F, C═O, and —C—OOH were introduced to a surface of a porous separator, was conducted in the same manner as in Example 1, except that the pressure condition of the gas mixture was changed to 5 KPa and 10 KPa instead of 30 KPa, and results thereof are shown in FIG. 7.

Figure 7:
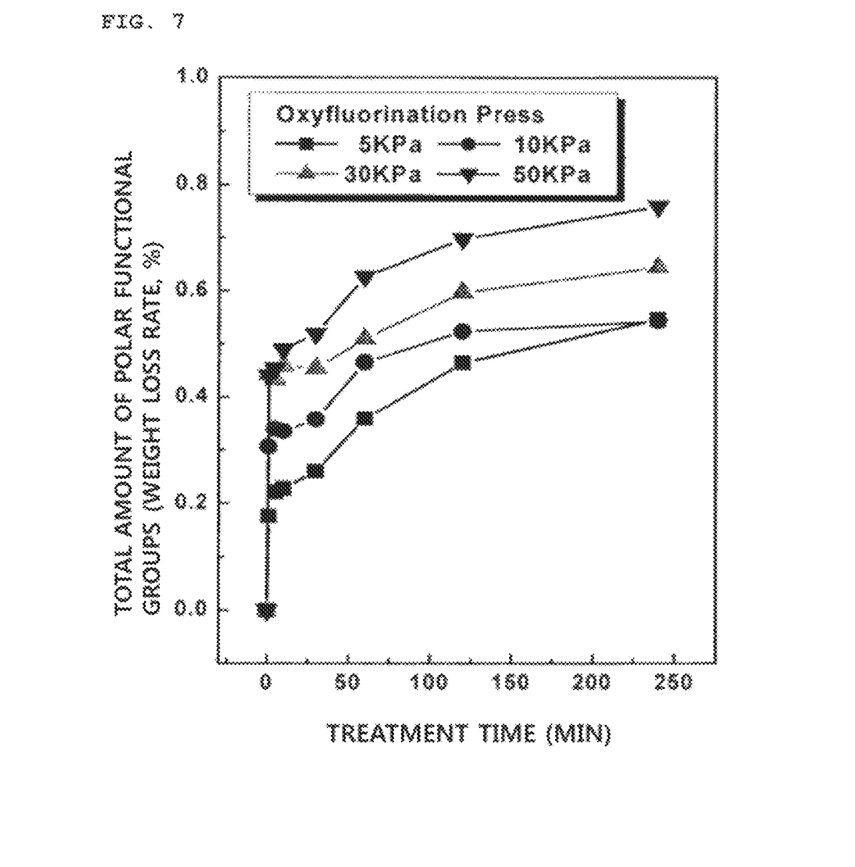
FIG. 7 is a graph showing measurement results of a total amount of polar functional groups of each of the porous separators of Examples 1 and 2, into which the polar functional groups were introduced.

Referring to FIG. 7, similarly to the above-described FT-ATR results and the molar concentrations per area of the polar functional groups, it was confirmed that, as the concentration and treatment time of the gas mixture increased, the total amount of the polar functional groups tended to increase, and the total amount of the polar functional groups of each of the porous separators of Example 1 and 2, into which the polar functional groups were introduced, ranged from 0.2 wt % to 0.8 wt %.

Experimental Example 3

In addition, each of the coin-type half-cells manufactured according to Examples 4 to 6 and Comparative Examples 4 to 6 was charged at a constant current (CC) of 0.8 C at 25° C. until the voltage reached 0.005 V, and then charged at a constant voltage (CV) of 0.005 V until the charging current reached 0.005 C (cut-off current), which is referred to as a $1^{st}$ cycle of charging. Subsequently, each coin-type half-cell was maintained for 20 minutes and then discharged at a CC of 0.8 C until the voltage reached 1.5 V. These processes were repeated for the $1^{st}$ cycle to the $70^{th}$ cycles. After the $70^{th}$ cycle, a capacity retention ratio was calculated using the following Equation:

Capacity retention ratio (%) after $70^{th}$ cycle=(discharge capacity at $70^{th}$ cycle/discharge capacity at $3^{rd}$ cycle)×100

TABLE 1

|  | Capacity retention ratio after $70^{th}$ cycle |
| --- | --- |
| Example 4 | 99.4% |
| Example 5 | 97.1% |
| Example 6 | 95.9% |
| Comparative Example 4 | 64.7% |
| Comparative Example 5 | 52.9% |
| Comparative Example 6 | 58.8% |

From the results shown in Table 1 above, it can be confirmed that the coin-type half-cells of Examples 4 to 6 exhibited much higher capacity retention ratios after the $70^{th}$ cycle than those of the coin-type half-cells of Comparative Examples 4 to 6.

The invention claimed is:

1. A separator for a lithium secondary battery, the separator comprising a porous resin comprising one or more polar functional groups selected from the group consisting of —C—F; and —C—OOH and —C=O on a surface thereof,
wherein, among the polar functional groups, a molar ratio of —C—OOH and —C=O to —C—F ranges from 0.6:0.4 to 0.8:0.2.

2. The separator of claim 1, wherein the one or more polar functional groups included in the porous resin are included in an amount of 0.7 mol/cm$^2$ to 6 mol/cm$^2$ with respect to a surface area of the porous resin.

3. The separator of claim 1, wherein the one or more polar functional groups are present in a region of 0.01 μm to 1 μm from a surface of the porous resin toward a center thereof.

4. The separator of claim 1, wherein a total amount of the polar functional groups included in the porous resin ranges from 0.1 wt % to 2 wt % based on 100 wt % of the separator.

5. The separator of claim 1, wherein the porous resin is formed of any one selected from the group consisting of high-density polyethylene, linear low-density polyethylene, low-density polyethylene, ultra-high-molecular-weight polyethylene, polypropylene, polyethylene terephthalate, polybutylene terephthalate, polyester, polyacetal, polyamide, polycarbonate, polyimide, polyether ether ketone, polyethersulfone, polyphenylene oxide, polyphenylene sulfide, and polyethylene naphthalene, or a mixture of two or more thereof.

6. A lithium secondary battery comprising the separator according to claim 1.

7. The lithium secondary battery of claim 6, wherein the lithium secondary battery comprises an insoluble lithium salt layer formed on a surface of a negative electrode.

8. The lithium secondary battery of claim 7, wherein an insoluble lithium salt of the insoluble lithium salt layer comprises one or more selected from the group consisting of lithium fluoride (LiF), lithium carbonate (Li$_2$CO$_3$), lithium oxide (Li$_2$O), lithium oxalate (Li$_2$C$_2$O$_4$), and lithium hydroxide (LiOH).

9. The lithium secondary battery of claim 7, wherein the insoluble lithium salt layer has a thickness of 0.001 μm to 0.5 μm.

10. The lithium secondary battery of claim 6, wherein the lithium secondary battery comprises lithium metal as a negative electrode.

11. A separator for a lithium secondary battery, the separator comprising a porous resin comprising one or more polar functional groups selected from the group consisting of —C—F; and —C—OOH and —C=O on a surface thereof,
wherein, among the polar functional groups, a molar ratio of —C—OOH and —C=O to —C—F ranges from 0.2:0.8 to 0.8:0.2,
wherein the separator is formed by preparing a gas mixture by mixing N$_2$ gas and O$_2$ gas with F$_2$ gas; and bringing the gas mixture into contact with the porous resin to form the polar functional group on the surface of the porous resin, and
wherein the one or more polar functional groups included in the porous resin are included in an amount of 0.7 mol/cm$^2$ to 6 mol/cm$^2$ with respect to a surface area of the porous resin.

* * * * *